United States Patent [19]

Martinez

[11] 4,265,160

[45] May 5, 1981

[54] COMPOSITE STAPLE-TYPE FASTENER HAVING RELATIVELY MOVABLE LOCKING PORTIONS

[76] Inventor: Renato G. Martinez, P.O. Box 177, Los Altos, Calif. 94022

[21] Appl. No.: 881,187

[22] Filed: Feb. 27, 1978

[51] Int. Cl.³ .............................................. F16B 15/00
[52] U.S. Cl. ................................... 411/442; 411/469; 411/474
[58] Field of Search ....................... 85/49, 13; 248/71; 206/346, 345, 343

[56] References Cited

U.S. PATENT DOCUMENTS

| | | | |
|---|---|---|---|
| 1,022,745 | 4/1912 | Kurz | 85/13 X |
| 2,172,259 | 9/1939 | Posnack | 85/49 X |
| 3,610,087 | 7/1969 | Dritz | 85/49 |

*Primary Examiner*—Ramon S. Britts
*Attorney, Agent, or Firm*—John J. Leavitt

[57] ABSTRACT

Presented is a fastener device of the staple-type which includes depending legs for penetration of an article to be fastened, and overlapping relatively movable interlockable web portions which assist in preventing inadvertent withdrawal of the fastener.

8 Claims, 9 Drawing Figures

U.S. Patent    May 5, 1981    4,265,160
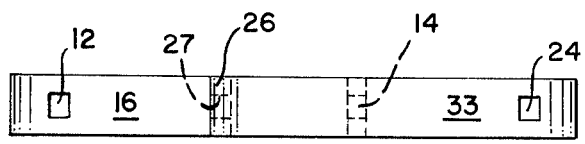
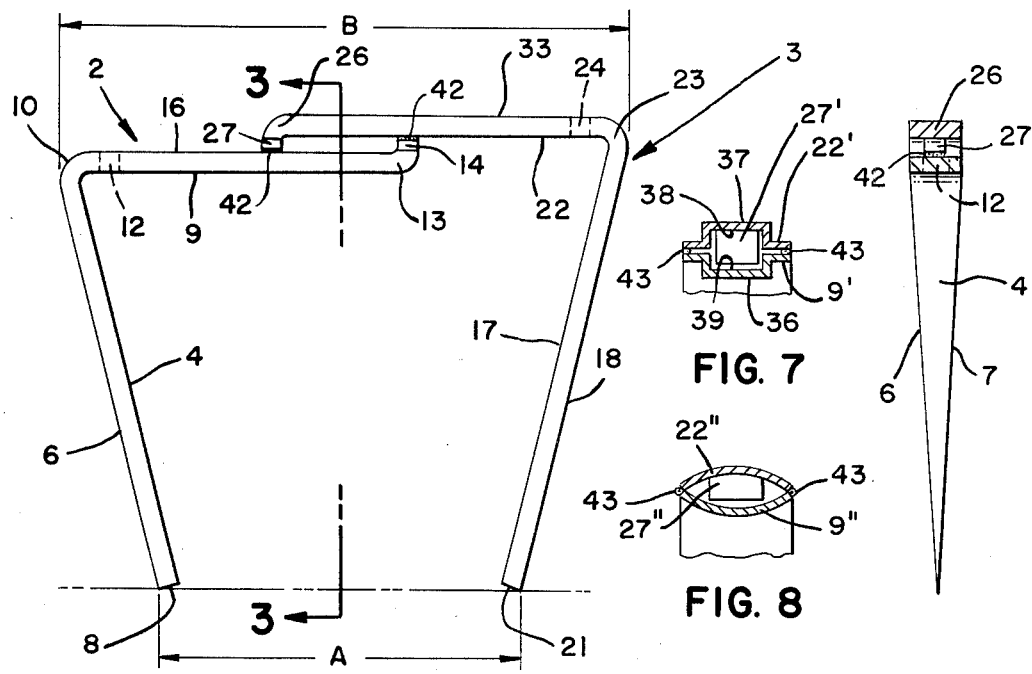
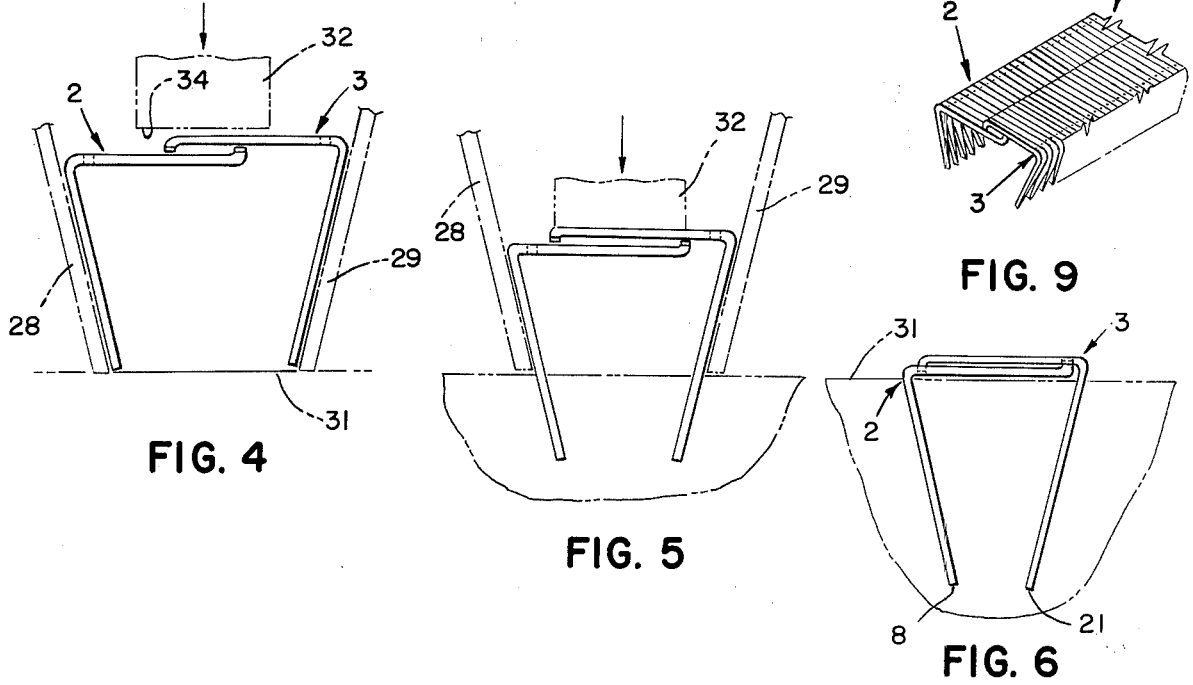

COMPOSITE STAPLE-TYPE FASTENER HAVING RELATIVELY MOVABLE LOCKING PORTIONS

BACKGROUND OF THE INVENTION

1. Field of the Invention

This invention relates to a staple-type fastener adapted to be arranged in multiple numbers in a connected series to form a cartridge and driven individually into engagement with an article to be fastened, and more particularly relates to such a staple-type fastener in which the legs or members that penetrate the article to be fastened penetrate at an angle, with the exposed ends of such legs being interconnected by overlapping webs movable relative to each other as the fastener is driven and interlockable when the fastener reaches its final position.

2. Description of the Prior Art

A search of the prior art has been made in Class 85, sub-classes 11, 13, 17, 23, 26, 38 and 49; and in Class 52, sub-class 543. As a result of such search, U.S. Pat. Nos. 2,132,259; 3,618,447; 3,788,187 and 3,885,491 have been found. All of these prior art patents relate to staple-type fastener devices but are distinguished from the subject matter of this invention in that they do not incorporate penetration members or legs that move toward each other during insertion and which are interconnected by relatively movable and interlocking webs.

Conventional staples that are used in industry with greater frequency possess the disadvantage that they tend to work loose and are readily disengaged, thus loosening whatever they are intended to secure. For instance, it is common practice to utilize generally U-shaped staples to attach red-cedar shingles in a roof structure. It has been found that as soon as the wood into which they are driven loses its resilience, generally through drying, there is a tendency for such staples to loosen in the furring strips through which they are driven, thus resulting in shingles being lifted from the roof by wind action.

Attempts have been made to obviate this disadvantage as indicated in U.S. Pat. No. 3,618,447 by providing barbs on the lebgs of the staple or, as indicated in U.S. Pat. No. 3,788,187 by causing the legs of the staple to diverge and move away from each other as they penetrate the wood. Accordingly, one of the objects of this invention is to provide a composite staple-like fastener possessing legs for penetration of an article to be fastened that move toward each other as the staple is driven and the upper ends of which legs are interconnected by interlocking webs that also simultaneously move relative to each other as the fastener is driven.

In a monolithic conventional staple-like fastener that has parallel legs driven straight into an article to be fastened there is no need for a connecting web comprised of relative movable portions. This distinction is also not necessary in a staple such as the one indicated in U.S. Pat. No. 3,788,187 in which the points of penetration of the legs are equally spaced with the opposite ends of the legs. However, in a fastener of the type forming the subject matter of this invention, where the points of penetration of the fastener legs are spaced closer together than the opposite ends of the legs, and which move even closer toward each other when driven, it is necessary that means be provided to accommodate the decrease in spacing between the upper ends of the legs while maintaining an interconnection between such legs. Accordingly, a still further object of the invention is the provision in a composite staple-type fastener having converging leg portions interengaging connecting web portions that move relative to each other when the staple is driven.

A still further object of the invention is the provision of a staple-like fastener incorporating spaced legs adapted to be driven into an article to be fastened, each of the legs having on one end a transversely extending web portion. slidably overlapping the corresponding web of the opposite leg and including locking lugs adapted to interengage to retain the webs in interlocked condition when driving of the composite staple-like fastener has been completed.

Another object of the invention is the provision of a driving structure including a housing for containing a multiplicity of the staple-like fasteners arranged in cartridge form prior to driving and which during the driving process forces the fastener legs of an individual fastener to move toward each other to achieve an ultimate interlocked condition.

The invention possesses other objects and features of advantage, some of which, with the foregoing, will be apparent from the following description and the drawings. It is to be understood however that the invention is not limited to the embodiment illustrated and described since it may be embodied in various forms within the scope of the appended claims.

SUMMARY OF THE INVENTION

In terms of broad inclusion, the composite staple-like fastener of the invention provides converging corresponding legs adapted to penetrate an article to be fastened, the legs of the fastener converging toward each other from interengaging and overlapping web portions adapted to move relative to each other as the fastener is driven and to be interlocked one with the other when the driving process has been completed. In another aspect of the invention, there is provided a driving structure utilizing converging housing walls that enclose the converging fastener legs and which impose transversely directed forces on the exposed portion of the fastener as it is driven to cause the web portions to slide relative to each other so that ultimately when completely driven the upper exposed ends of the fastener are no wider than the spacing between the points of the penetrating legs prior to insertion.

BRIEF DESCRIPTION OF THE DRAWINGS

FIG. 1 is a side elevational view of one of the composite fasteners, shown in enlarged form for purposes of clarity. The fastener is illustrated in this figure in its extended form prior to driving.

FIG. 2 is a top plan view of the composite fastener illustrated in FIG. 1.

FIG. 3 is a vertical sectional view taken in the plane indicated by the line 3—3 in FIG. 1.

FIG. 4 is a front elevational view similar to FIG. 1 and showing the composite fastener in its initial position contained within the constricting and converging walls of a supporting housing and showing the relationship of the anvil of the driving structure in relation to the overlapping webs.

FIG. 5 is a view similar to FIG. 4 but showing the relative positions of the parts after the composite fastener has been partly driven.

FIG. 6 is a view similar to FIGS. 4 and 5 but showing the relationship of the parts and the position of the FIG. 7 is a fragmentary vertical cross-sectional view through the overlapping webs and illustrating a second configuration of the webs.

FIG. 8 is a fragmentary vertical cross-sectional view through the overlapping webs and illustrating a third configuration of the webs.

FIG. 9 is a perspective view in reduced scale illustrating a multiplicity of the fasteners arranged into a composite series to form a cartridge of such fasteners.

DESCRIPTION OF THE PREFERRED EMBODIMENT

In terms of greater detail, the coposite staple-like fastener of the invention is designed to inherently resist withdrawal. It achieves this purpose by being formed from two independent parts designated generally 2 and 3 and shown best in FIGS. 1 through 3, the part 2 including a leg portion 4 the side edges 6 and 7 of which are tapered as shown (FIG. 3) so that the penetrating end of the leg is provided with a relatively sharp point.

At its opposite end, the leg 4 is bent inwardly to provide an integral web portion 9 conveniently of uniform width and having adjacent the integral bend 10 an aperature 12 extending through the web. At its end remote from the bend 10, the web portion 9 is provided with an upturned portion 13 terminating in a lock lug 14. It should be noted that the lock lug 14 projects above or beyond the top surface 16 of the web 9 and that its configuration and dimensions are such that the lock lug may be inserted into an aperture formed in the web of the opposing part 3.

The corresponding part 3 of the fastener also includes a depending leg 17 having converging side edges 18 and 19 similar to the side edges 6 and 7 of the leg 4, the leg 17 terminating in a point 21 similar to the point 8. Additionally, the leg 17 merges smoothly with web 22 extending transversely thereto and having a uniform width and joined integrally by a bend 23. Closely adjacent the bend 23, the web 22 is provided with an aperture 24 while the opposite end of the web 22, i.e., the end thereof remote from the bend 23 is provided with a downwardly extending portion 26 terminating in a lock lug 27.

It should be noted that the lock lug 27 is configured and dimensioned to correspond to the configuration and dimension of the aperture 12 in part 2 and, in like manner, the lock lug 14 is configured and dimensioned to fit snugly into the aperture 24.

To prevent withdrawal of the fastener once it is driven into final position, the legs 4 and 17 converge toward each other in all attitutdes, and in the attitude illustrated in FIGS. 1 and 4, the points 8 and 21 of the legs are spaced apart a pre-determined distance "A". The spacing between the curved portions 10 and 23 at the opposite ends of the legs 4 and 17 may be designated as the distance "B" and as illustrated is considerably greater than the distance "A", whereby the legs 4 and 17 converge toward each other in the free standing position illustrated in FIG. 1 which corresponds to the configuration of the composite fastener immediately prior to driving, as illustrated in FIGS. 4. The effect of such convergence of the legs 4 and 17 is that they will continue to converge as illustrated in FIG. 5 as they are driven into the article to be secured.

To effectively drive a fastener having the characteristic of converging legs, especially as it is desired that such convergence be maintained during the driving sequence, it is necessary that the legs 4 and 17 be supported over their entire length and for this purpose there is provided a housing illustrated schematically in FIGS. 4 and 5 and including side walls 28 and 29 open at their lower ends to provide an aperture 31 through which the fastener is driven by an appropriate anvil 32, the width of the anvil being substantially equal to the dimension "A" in FIG. 1, as is the opening 31 through which the fastener must pass. In thickness, the anvil 32 is appropriate for the width of the web portions 9 and 22 and, as illustrated in FIGS. 4 and 5, the anvil engages the upper surface 33 of the web 22 and imposes a downwardly directed force to cause the legs 4 and 17 to penetrate an underlying member.

As penetration proceeds, as indicated in FIG. 5, the legs penetrate at an angle which causes relative convergence of the points 8 and 21 while the bend portions 10 and 23 also converge toward one another, causing relative movement between the overlapping and interengaged web portions 9 and 22. Continued penetration of the fastener with concommitant relative movement between the legs 4 and 17 and the associated housing walls 28 and 29 causes a lateral force to be imposed on the upper ends of the legs to effect a diminution of the dimension "B" that is progressive as the fastener is driven. Ultimately, the dimension "B" of the completely driven fastener equals the dimension "A" and is therefore permitted to pass through the opening 31 between the bottom ends of housing walls 28 and 29.

It should be understood that in this driving process there is physical contact between the lock lugs 14 and 27 and the associated and oppositely positioned web portions 22 and 9, respectively, the lug 14 engaging the undersurface of web 22 while the lug 27 engages the upper surface 16 of the web 9. Additionally, as the webs 9 and 22 move transversely relative to one another, there is also relative movement between the bottom end 34 of the anvil 32 and the associated top surface 33 of the web on which it impinges. The forces are such that there is greater resistance to bending of the web portions 9 and 22 than there is to slidable movement between the anvil and the associated web or to penetration between fastener legs 4 and 17. Additionally, the action is so fast that it occurs in a fraction of a second in the same manner that a conventional staple device functions.

When driving of the composite fastener has been completed, the lock lug 27 will be engaged in aperture 12, and lock lug 14 will be engaged in aperture 24 as illustrated in FIG. 6. In this position of the parts it will be noted that the interconnecting webs provide a double thickness and therefore provide double strength to prevent loosening of whatever object is being fastened. It should also be noted that to effect withdrawal of the driven fastener as illustrated in FIG. 6 would require that the legs 4 and 17 be pulled upwardly in such a way that they would retrace the path created when they penetrated. But to effect such a withdrawal, there must be overcome a component of force that resists such withdrawal, caused by the inclination of the leg within the material in which it is embedded. Accordingly, it is much more difficult or requuires considerably more force to withdraw a fastener in which the legs are "clinched" as illustrated in FIG. 6 than it is to withdraw a fastener in which the legs are substantially parallel or which are splayed outwardly.

In the embodiment of the invention illustrated in FIG. 7, the webs 9' and 22' are formed to provide a beam-like rigidity or stiffness byy beads 36 and 37, respectively, extending the length of the webs. The beads are formed by displacing material from a central section of each web, thus creating opposing elongated recesses 38 and 39 which cooperate with the lock lugs on the webs to guide the relative movement between the two webs. The lock lugs extend into the elongated recesses and prevent lateral displacement of the ends of the webs.

The embodiment illustrated in FIG. 8 is similar in purpose to the embodiment of FIG. 7, but here the webs 9" and 22" possess an arcuate cross-section to provide the beam-like effect. As before, the recesses or concave surfaces of the opposed webs face each other, creating a recess into which the lock lug on the opposing web may project to again guide relative movement and prevent lateral displacement of the ends of the webs.

As shown in FIG. 9, the composite fasteners are arranged in a series and, prior to use, are held together to form a cartridge designated generally by the numeral 41. One fastener is releasably secured to another adjacent fastener by application of a suitable cement or adhesive between selected parts of the fasteners. For instance, in the embodiment of FIGS. 1 through 6, adhesive or cement in a layer 42 may be applied between the ends of the lock lugs 14 and 27 and the associated surfaces of the webs. If necessary for stability in cartridge form the lateral edges of the webs may also be coated with adhesive so that the lateral edges of each web will adhere to the lateral edges of the next adjacent fasteners.

In the FIGS. 7 and 8 embodiments, adhesive may be applied as a bead 43 along the lateral edges of the overlapping webs and, as before, between each lock lug and the associated surface of the opposing web. Such adhesive serves to hold the series of fasteners together to form a cartridge while permitting each individual fastener to be "sheared" from the cartridge during the driving process. Staples may also be taped together and released by the driving force of the anvil.

Having thus described the invention what is believed to be new and novel and sought to be protected by Letters Patent of the United States is as follows.

I claim:

1. A composite staple-like drivable fastener comprising first and second parts adapted to be driven simultaneously and each including a leg portion converging toward the other leg portion and mutually reaching web portions arranged in partially overlapping engagement and adapted while so engaged to simultaneously move relative to one another into further overlapping engagement when the fastener is driven, and means retaining said first and second staple parts in partially overlapping engagement prior to being driven and adapted to release said staple parts for said relative movement when said staple parts are driven.

2. The combination according to claim 1, in which means are provided on said mutually reaching web portions to effect interlocking of said web portions when said fastener is driven into final position.

3. The combination according to claim 1, in which said leg portions converge toward each other in the direction in which said fastener is adapted to be driven.

4. The combination according to claim 1, in which a multiplicity of said composite staple-like fasteners are arranged side-by-side to form an elongated cartridge, and means are provided retaining said multiplicity of composite staple-like fasteners in cartridge form prior to being driven.

5. A staple-like drivable fastener comprising first and second parts each including a leg portion converging toward the other leg portion and mutually reaching web portions arranged in overlapping relationship and adapted to move relative to one another when the fastener is driven, each said web portion including an integral metallic strip, socket means formed in each said web portion adjacent one end thereof, and lock lug means formed on the opposite end of each said web portion remote from the socket therein, whereby when said webs are in maximum overlapping relationship the lock lug of one web engages the socket in the opposite web to effect interlocking of said webs.

6. A staple-like driveable fastener comprising first and second parts each including a leg portion converging toward the other leg portion and mutually reaching web portions arranged in overlapping relationship and adapted to move relative to one another when the fastener is driven, means on said mutually reaching web portions to effect interlocking of said web portions when said fastener is driven to final position, each said web being formed with an elongated recess, and said means to effect interlocking of said web portions engage said recesses to prevent lateral displacement of said web portions and retain their alignment during relative movement thereof.

7. The combination according to claim 6, in which said webs are formed to provide a hat-shaped cross-section.

8. The combination according to claim 6, in which said webs are formed to provide an arcuate cross-section, the concave surfaces of opposing webs facing each other.

* * * * *